(12) United States Patent
Bruns et al.

(10) Patent No.: US 8,095,288 B2
(45) Date of Patent: Jan. 10, 2012

(54) REDUCING OSCILLATIONS IN A MOTOR VEHICLE DRIVELINE

(75) Inventors: Richard D. Bruns, Dearborn, MI (US); Ashok Rodrigues, Farmington Hills, MI (US); Syun K. Lee, Ann Arbor, MI (US); Peter J. Barrette, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 407 days.

(21) Appl. No.: 12/425,777

(22) Filed: Apr. 17, 2009

(65) Prior Publication Data

US 2010/0268429 A1    Oct. 21, 2010

(51) Int. Cl.
*G06F 17/00* (2006.01)
*G06F 7/00* (2006.01)

(52) U.S. Cl. ............................. 701/69; 701/67
(58) Field of Classification Search .................... 701/67, 701/68, 69, 70, 82, 90, 91, 96; 180/197; 192/35, 84.1, 84.7
See application file for complete search history.

(56) References Cited

U.S. PATENT DOCUMENTS

| | | | |
|---|---|---|---|
| 5,690,002 A | 11/1997 | Showalter | |
| 5,803,197 A * | 9/1998 | Hara et al. | 180/248 |
| 5,850,616 A * | 12/1998 | Matsuno et al. | 701/82 |
| 6,533,090 B2 | 3/2003 | Osborn et al. | |
| 6,699,151 B2 | 3/2004 | Grogg et al. | |
| 6,725,989 B1 | 4/2004 | Krisher et al. | |
| 6,729,426 B2 * | 5/2004 | Suzuki | 180/197 |
| 6,770,005 B2 | 8/2004 | Aikawa et al. | |
| 6,848,550 B2 | 2/2005 | Puiu et al. | |
| 6,935,455 B2 | 8/2005 | Murakami et al. | |
| 6,991,585 B2 | 1/2006 | Colvin et al. | |
| 7,024,290 B2 | 4/2006 | Zhao et al. | |
| 7,124,850 B2 * | 10/2006 | Lee et al. | 180/248 |
| 2002/0087252 A1 * | 7/2002 | Shimizu et al. | 701/84 |
| 2004/0078129 A1 * | 4/2004 | Matsuno et al. | 701/67 |
| 2008/0234906 A1 * | 9/2008 | Warner | 701/67 |

* cited by examiner

*Primary Examiner* — Paul N Dickson
*Assistant Examiner* — Barry Gooden, Jr.
(74) *Attorney, Agent, or Firm* — David B. Kelley; MacMillan, Sobanski & Todd, LLC

(57) ABSTRACT

A method for reducing oscillations in a vehicle driveline includes transmitting torque to secondary wheels of the vehicle, determining a first rate of change in speed between the secondary wheels and primary wheels, if a second rate of change in speed between secondary wheels and primary wheels is greater than the first rate of change, reducing torque transmitted to the secondary wheels proportional to a ratio of the first rate of change and the second rate of change, and if the second rate of change is less than the first rate of change, using differential and proportional control to change said torque.

18 Claims, 3 Drawing Sheets

REDUCING OSCILLATIONS IN A MOTOR VEHICLE DRIVELINE

BACKGROUND OF THE INVENTION

1. Field of the Invention

This invention relates generally to a motor vehicle driveline and, more particularly to an all-wheel-drive (AWD) powertrain that transmits power continually to the wheels of a primary axle and selectively to the wheels of a secondary axle.

2. Description of the Prior Art

Driveline oscillations can occur when a vehicle equipped with front wheel drive (FWD) based AWD accelerates on a surface having a low coefficient of friction, such as a surface covered with ice or snow. During an aggressive acceleration on the surface, front and rear tires begin to slip at different times causing energy stored in the driveline to be released and the vehicle driveline to oscillate torsionally. The driveline oscillations can cause premature failure of driveline components and noise and vibration inside the vehicle.

These oscillations occur when the rear wheel speeds overrun the front wheel speeds in an active clutch based AWD system.

Unsatisfactory solutions include merely reducing the noise through increased use of sound deadening materials and truncating the peak torque commanded by the AWD system.

A need exists in the industry for a technique that detects the speed over-run, releases the energy stored in the driveline and reduces the torque in the AWD system.

SUMMARY OF THE INVENTION

A method for reducing oscillations in a vehicle driveline includes transmitting torque to secondary wheels of the vehicle, determining a first rate of change in speed between the secondary wheels and primary wheels, if a second rate of change in speed between secondary wheels and primary wheels is greater than the first rate of change, reducing torque transmitted to the secondary wheels proportional to a ratio of the first rate of change and the second rate of change, and if the second rate of change is less than the first rate of change, using differential and proportional control to change said torque.

The invention contemplates a system for controlling a vehicle driveline including primary wheels and secondary wheels, a clutch for transmitting torque to the secondary wheels, and a controller configured to determine a first rate of change in speed between the secondary wheels and primary wheels; reduce said torque in proportion to a ratio of the first rate of change and the second rate of change, if a second rate of change in speed between secondary wheels and primary wheels is greater than the first rate of change; and use differential and proportional control to change said torque, if the second rate of change is less than the first rate of change.

The oscillation control and system detect the over-run and releases the energy stored in the driveline by reducing the torque in the AWD system.

An AWD clutch converts energy stored in the driveline to heat as the clutch slips. This controlled release or dissipation of energy in the driveline eliminates noise and vibration helping to increase the service life of the driveline components.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
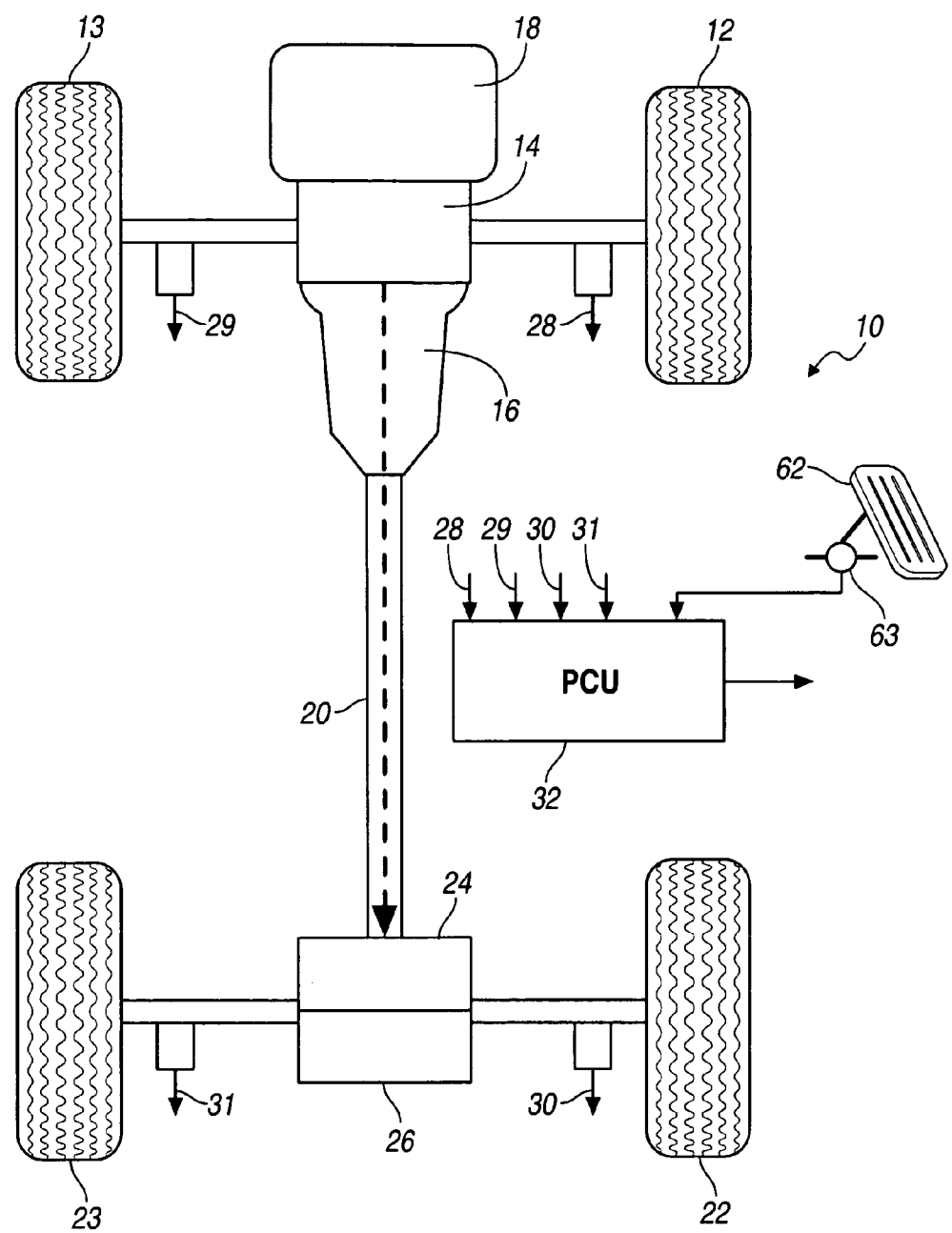
FIG. 1 is a schematic diagram showing a motor vehicle driveline equipped with an AWD system.

Referring now to the drawings, there is illustrated in FIG. 1 a motor vehicle driveline 10 equipped with an AWD system. The front wheels 12, 13 are driveably connected to the output of a front axle differential 14, whose input is connect the output of a transmission 16, which produces multiple forward speeds and a reverse drive. The front differential 14 transmits one-half of its input torque to each of the front wheels 12, 13. The transmission is driven by a power source 18, such as internal combustion engine or an electric motor.

A driveshaft 20 transmits rotating power from the transmission 16 to the rear wheels 22, 23 through a clutch assembly 24 and a rear inter-wheel differential 26, which transmits one-half of its input torque to each of the rear wheels 22, 23.

Speed sensors each transmit to a powertrain control unit (PCU) 32, a signal 28-31 representing the rotational speed of a respective front wheel or rear wheel. PCU 32 includes a microprocessor accessible to electronic memory containing constants, variables and parameters related to operation of the vehicle and powertrain, and vehicle control algorithms expressed in computer code, which algorithms are executed repeatedly at frequent intervals.

Figure 2:
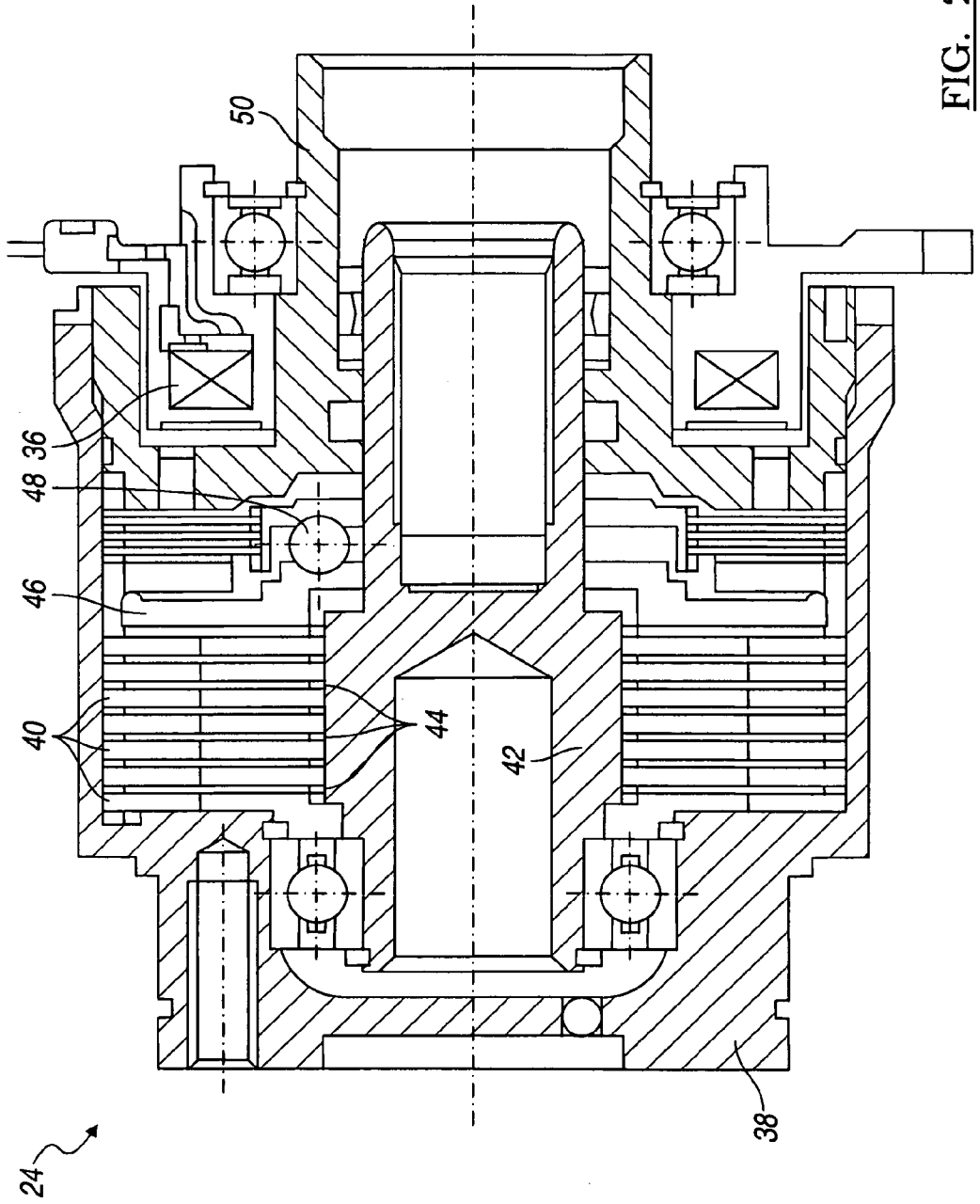
FIG. 2 is cross sectional view of a clutch assembly that varies torque transmitted to a rear inter-wheel differential.

FIG. 2 illustrates the clutch assembly 24, whose capacity to transmit torque varies in response to the magnitude of electric current supplied to a coil 36 under the control of PCU 32. A housing 38, secured to driveshaft 20, is secured to a first set of clutch plates 40 by spline at the radial outer periphery of the plates 40, and an intermediate shaft 42 is secured is secured to a second set of clutch plates 44 by spline at the radial inner periphery of the plates 44, which are each located between two of the plates 40.

When coil 36 is energized, a plate 46, actuated through a ball ramp 48, forces the clutch plates 40, 44 into mutual frictional contact, thereby driveably connecting housing 38 and shaft 42. An output 50, connected to shaft 42, is driveably connected to the input of the rear differential mechanism 26. The operating state of clutch 24 varies among full locked or closed, partially locked or slipping, and fully unlocked or open.

Figure 3:
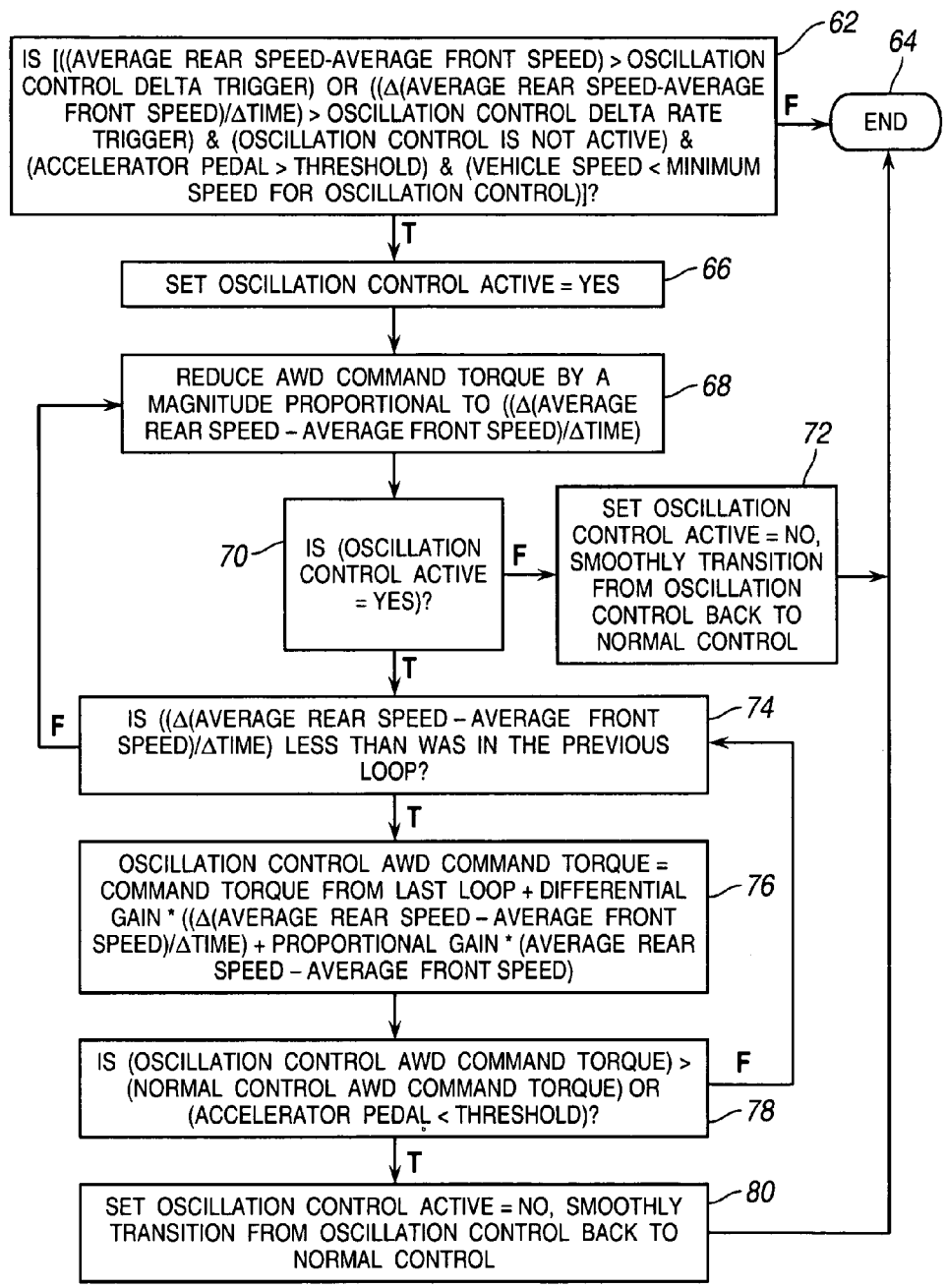
FIG. 3 is logic flow diagram illustrating the steps of a method for reducing oscillations in the motor vehicle driveline.

An algorithm for reducing oscillations in the motor vehicle driveline is illustrated in FIG. 3. A test is performed at step 60 to determine (1) if the average rear wheel speed minus the average front wheel speed is greater than an oscillation control delta reference speed; or (2) if a change during a time period in the average rear wheel speed minus the average front wheel speed) is greater than an oscillation control delta speed rate reference; and (3) the oscillation control algorithm is not active; and (4) the position of the accelerator pedal 62 is greater than a reference pedal position; and (5) vehicle speed is less than a minimum vehicle speed for oscillation control. A sensor 63 produces an electronic signal transmitted as input to the controller 32 representing the extent to which the accelerator pedal 62 is depressed, i.e., the position of the accelerator pedal.

If the result of test 60 is logically false, control passes to step 64 where execution of the oscillation control algorithm is terminated.

If the result of test 60 is logically true, at step 66 a flag is set to indicate that the oscillation control is active.

At step 68, the AWD commanded torque transmitted by clutch 24 to the rear differential 26 is reduced by a magnitude that is proportional to a change in the average rear wheel speed minus the average front wheel speed that occurs during a time interval, whose length is preferably the length of the sampling interval.

A test is performed at step 70 to determine if the oscillation control is active and the accelerator pedal position is greater than the reference pedal position.

If the result of test 70 is false, at step 72 a flag is set to indicate that the oscillation control is inactive, and a smooth transition from oscillation control torque of clutch 24 back to normal control is performed. Then control returns to step 64 where execution of the oscillation control algorithm is terminated.

If the result of test 70 is true, a test is performed at step 74 to determine if the change in the average rear wheel speed minus the average front wheel speed during the most recent sampling interval is less than that change during at least one of the previous sampling intervals.

If the result of test 74 is false, control returns to step 68.

If the result of test 74 is true, at step 76 the AWD torque transmitted by clutch 24 is set equal to the commanded torque transmitted by clutch 24 during the previous execution of the oscillation reduction algorithm plus a differential gain multiplied by the change in the average rear wheel speed minus the average front wheel speed during the corresponding sampling interval plus a proportional gain multiplied by the difference between average rear wheel speed—the average front wheel speed.

At step 78 a test is performed to determine whether the oscillation control AWD commanded torque transmitted by clutch 24 is greater than a reference control AWD commanded torque) or whether the position of accelerator pedal 62 is less than a reference accelerator pedal position.

If the result of test 78 is false, control returns to step 74.

If the result of test 74 is true, at step 80 a flag is set indicating that the oscillation control is inactive, and a smoothly transition from oscillation control back to normal control is performed. Thereafter, control returns to step 64.

The invention has been described with reference to a vehicle in which the principal axle, i.e., the front wheels 12, 13, are continually driven while the vehicle is operating and the secondary axle, i.e., the rear wheels 22, 23, are driven selectively through the clutch assembly under control of the PCU 32. The invention can be applied also to a vehicle whose rear wheels 12, 13 are continually driven while the vehicle is operating and the front wheels 12, 13, are driven selectively through a clutch assembly under control of an electronic controller.

In accordance with the provisions of the patent statutes, the preferred embodiment has been described. However, it should be noted that the alternate embodiments can be practiced otherwise than as specifically illustrated and described.

The invention claimed is:

1. A method for reducing oscillations in a vehicle driveline, comprising:
   (a) reducing torque transmitted to secondary wheels in proportion to first and second rates of change in a difference between a speed of the secondary wheels and primary wheels;
   (b) if a rate of said change is less than a rate of said change during a previous sampling interval, using differential and proportional control to change said torque.

2. The method of claim 1 wherein:
   the first rate of change is a first rate of change in an average speed of the secondary wheels and an average speed of the primary wheels;
   the second rate of change is a second rate of change in the average speed of the secondary wheels and the average speed of the primary wheels.

3. The method of claim 1 further comprising terminating the method if the torque transmitted to the secondary wheels is less than a reference torque.

4. The method of claim 1 further comprising terminating the method if a position of an accelerator pedal is less than a reference accelerator pedal position.

5. The method of claim 1 wherein step (b) further comprises changing said torque using a differential gain multiplied by the second rate of change plus a proportional gain multiplied by a difference between an average speed of the secondary wheels and an average speed of the primary wheels.

6. The method of claim 5 wherein:
   the first rate of change is a first rate of change in the average speed of the secondary wheels and the average speed of the primary wheels;
   the second rate of change is a second rate of change in the average speed of the secondary wheels and the average speed of the primary wheels.

7. A method for reducing oscillations in a vehicle driveline, comprising:
   (a) transmitting torque to secondary wheels of a vehicle;
   (b) determining a first rate of change between an average speed of the secondary wheels and an average speed of primary wheels;
   (c) if a second rate of change between the average speed of the secondary wheels and the average speed of the primary wheels is greater than the first rate of change, reducing the torque transmitted to the secondary wheels proportional to a ratio of the first rate of change and the second rate of change;
   (d) if the second rate of change is less than the first rate of change, using differential and proportional control to change said torque.

8. The method of claim 7 wherein step (d) further comprises changing said torque using a differential gain multiplied by the second rate of change plus a proportional gain multiplied by a difference between the average speed of the secondary wheels and the average speed of the primary wheels.

9. The method of claim 7 further comprising terminating the method if the torque transmitted to the secondary wheels is less than a reference torque.

10. The method of claim 7 further comprising terminating the method if a position of an accelerator pedal is less than a reference accelerator pedal position.

11. A system for controlling a vehicle driveline, comprising:
primary wheels and secondary wheels;
a clutch for transmitting torque to the secondary wheels;
a controller configured to determine a first rate of change in speed between the secondary wheels and the primary wheels; reduce said torque in proportion to a ratio of the first rate of change and a second rate of change, if a second rate of change in speed between the secondary wheels and the primary wheels is greater than the first rate of change; and use differential and proportional control to change said torque, if the second rate of change is less than the first rate of change.

12. The system of claim 11 wherein:
the controller is further configured to determine the first rate of change using a first rate of change in an average speed of the secondary wheels and an average speed of the primary wheels, and to determine the second rate of change using a second rate of change in the average speed of the secondary wheels and the average speed of the primary wheels.

13. The system of claim 11 wherein the controller is further configured to terminate the method if the torque transmitted to the secondary wheels is less than a reference torque.

14. The system of claim 11 wherein the controller is further configured to terminate the method if a position of an accelerator pedal is less than a reference accelerator pedal position.

15. The system of claim 11 wherein the controller is further configured to change said torque using a differential gain multiplied by the second rate of change plus a proportional gain multiplied by a difference between an average speed of the secondary wheels and an average speed of the primary wheels.

16. The system of claim 15 wherein:
the controller is further configured to determine the first rate of change using a first rate of change in an average speed of the secondary wheels and an average speed of the primary wheels, and to determine the second rate of change using a second rate of change in the average speed of the secondary wheels and the average speed of the primary wheels.

17. The system of claim 11 further comprising:
first sensors, each of the first sensors communicating with the controller and producing a signal representing a speed of one of the primary wheels;
second sensors, each of the second sensors communicating with the controller and producing a signal representing a speed of one of the secondary wheels.

18. The system of claim 17 further comprising:
an accelerator pedal;
a sensor communicating with the controller and producing a signal representing a position of the accelerator pedal.

* * * * *